(12) United States Patent
Luo et al.

(10) Patent No.: US 11,164,579 B2
(45) Date of Patent: Nov. 2, 2021

(54) METHOD AND APPARATUS FOR GENERATING INFORMATION

(71) Applicant: Baidu Online Network Technology (Beijing) Co., Ltd., Beijing (CN)

(72) Inventors: Xiajun Luo, Beijing (CN); Shiquan Ye, Beijing (CN); Wenjuan Zhou, Beijing (CN); Yajuan Feng, Beijing (CN); Chenxi Gao, Beijing (CN); Hao Yang, Beijing (CN)

(73) Assignees: Baidu Online Network Technology (Beijing) Co., Ltd., Beijing (CN); Shanghai Xiaodu Technology Co. Ltd., Shanghai (CN)

( * ) Notice: Subject to any disclaimer, the term of this patent is extended or adjusted under 35 U.S.C. 154(b) by 209 days.

(21) Appl. No.: 16/448,319

(22) Filed: Jun. 21, 2019

(65) Prior Publication Data

US 2020/0013399 A1    Jan. 9, 2020

(30) Foreign Application Priority Data

Jul. 3, 2018    (CN) .......................... 201810719465.0

(51) Int. Cl.
*G10L 15/22*    (2006.01)
*G10L 15/05*    (2013.01)
(Continued)

(52) U.S. Cl.
CPC .............. *G10L 15/22* (2013.01); *G10L 15/05* (2013.01); *G10L 15/1822* (2013.01); *G10L 2015/088* (2013.01); *G10L 2015/223* (2013.01)

(58) Field of Classification Search
CPC ......... G10L 15/22; G10L 15/00; G10L 15/08; G10L 15/18; G10L 15/1815;
(Continued)

(56) References Cited

U.S. PATENT DOCUMENTS

| 2008/0059150 A1* | 3/2008 | Wolfel | G06F 16/639 |
| | | | 704/9 |
| 2008/0221891 A1* | 9/2008 | Konig | G10L 15/22 |
| | | | 704/252 |

(Continued)

FOREIGN PATENT DOCUMENTS

| CN | 107247768 A | 10/2017 |
| JP | 2003141151 A | 5/2003 |

(Continued)

*Primary Examiner* — Qi Han
(74) *Attorney, Agent, or Firm* — Nixon Peabody LLP (57) ABSTRACT

A method and an apparatus for generating information are provided. The method includes: determining, in response to receiving a first user sentence, whether a keyword of a preset first category is included in the first user sentence, the first category including at least one subcategory; determining, in response to determining the first category keyword being included in the first user sentence, the first category keyword included in the first user sentence as a first keyword, and determining a subcategory to which the first keyword belongs, to generate a first keyword set and a subcategory set; and selecting, based on the first keyword set and the subcategory set, a song list from a pre-generated song list set as a to-be-played song list, to generate a to-be-played song list set, the song list including at least one piece of audio and song list category information.

9 Claims, 6 Drawing Sheets

(51) Int. Cl.
*G10L 15/18* (2013.01)
*G10L 15/08* (2006.01)

(58) Field of Classification Search
CPC ... G10L 15/1822; G10L 15/183; G10L 15/19;
G10L 15/26; G10L 2015/22; G10L
2015/00; G10L 2015/06; G10L 2015/08;
G10L 2015/223; G10L 2015/225; G10L
2015/228
USPC ... 704/257, 9, 243, 231, 245, 249, 250, 255,
704/270, 270.1, 275
See application file for complete search history.

(56) References Cited

U.S. PATENT DOCUMENTS

2019/0147052 A1   5/2019  Lu
2019/0147053 A1   5/2019  Lu

FOREIGN PATENT DOCUMENTS

JP   2006047644 A   2/2006
JP   2011023090 A   2/2011

* cited by examiner

METHOD AND APPARATUS FOR GENERATING INFORMATION

CROSS-REFERENCE TO RELATED APPLICATIONS

This application claims priority to Chinese Patent Application No. 201810719465.0, filed on Jul. 3, 2018, titled "Method and Apparatus for Generating information," which is hereby incorporated by reference in its entirety.

TECHNICAL FIELD

Embodiments of the present disclosure relate to the field of computer technology, and specifically to a method and apparatus for generating information.

BACKGROUND

With the development of the computer technology, a smart speaker may perform a voice interaction with a user, to recommend a song the user wants to listen to. In the existing technology, a large number of songs are often pre-annotated in a manual way. During the voice interaction with the user, an analysis may be performed on the voice of the user, and then, a related song is selected from the pre-annotated songs for pushing.

SUMMARY

Embodiments of the present disclosure propose a method and apparatus for generating information.

In a first aspect, embodiments of the present disclosure provide a method for generating information. The method includes: determining, in response to receiving a first user sentence, whether a keyword of a preset first category is included in the first user sentence, the first category including at least one subcategory; determining, in response to determining the first category keyword being included in the first user sentence, the first category keyword included in the first user sentence as a first keyword, and determining a subcategory to which the first keyword belongs, to generate a first keyword set and a subcategory set; and selecting, based on the first keyword set and the subcategory set, a song list from a pre-generated song list set as a to-be-played song list, to generate a to-be-played song list set, the song list including at least one piece of audio and song list category information.

In some embodiments, the selecting, based on the first keyword set and the subcategory set, a song list from a pre-generated song list set as a to-be-played song list, to generate a to-be-played song list set includes: determining, in response to at least two first keywords being included in the first keyword set, whether a song list satisfying a preset condition is included in the pre-generated song list set, based on the at least two first keywords and subcategories to which the at least two first keywords belong; and selecting, in response to the song list satisfying the preset condition being included in the pre-generated song list set, the song list satisfying the preset condition as the to-be-played song list, to generate the to-be-played song list set.

In some embodiments, the first category keyword is preset to have a weight value. The method further includes: determining, in response to the song list satisfying the preset condition being not included in the pre-generated song list set, weight values of the at least two first keywords respectively; and selecting, based on a first keyword having a maximum weight value and a subcategory to which the first keyword having the maximum weight value belongs, a song list from the pre-generated song list set as the to-be-played song list, to generate the to-be-played song list set.

In some embodiments, the method further includes: determining, in response to determining a preset second category keyword being included in the first user sentence, the second category keyword included in the first user sentence as a second keyword; and determining, based on the second keyword and the first keyword set, a target keyword from the preset first category keyword, and determining a subcategory to which the target keyword belongs. The selecting, based on the first keyword set and the subcategory set, a song list from a pre-generated song list set as a to-be-played song list, to generate a to-be-played song list set includes: selecting, based on the target keyword and the subcategory to which the target keyword belongs, a song list from the pre-generated song list set as the to-be-played song list, to generate the to-be-played song list set.

In some embodiments, the method further includes playing the audio included in the song list in the to-be-played song list set.

In some embodiments, the method further includes: performing, in response to receiving determining a preset third category keyword being included in a received second user sentence, a corresponding preset operation based on the third category keyword included in the second user sentence, the preset operation including one of: switching a currently played song list and adding the currently played song list to favourites.

In a second aspect, the embodiments of the present disclosure provide an apparatus for generating information. The apparatus includes: a first category keyword determining unit, configured to determine, in response to receiving a first user sentence, whether a keyword of a preset first category is included in the first user sentence, the first category including at least one subcategory; a first keyword set and subcategory set generating unit, configured to determine, in response to determining the first category keyword being included in the first user sentence, the first category keyword included in the first user sentence as a first keyword, and determine a subcategory to which the first keyword belongs, to generate a first keyword set and a subcategory set; and a to-be-played song list set generating unit, configured to select, based on the first keyword set and the subcategory set, a song list from a pre-generated song list set as a to-be-played song list, to generate a to-be-played song list set, the song list including at least one piece of audio and song list category information.

In some embodiments, the to-be-played song list set generating unit is further configured to: determine, in response to at least two first keywords being included in the first keyword set, whether a song list satisfying a preset condition is included in the pre-generated song list set, based on-heat least two first keywords and subcategories to which the at least two first keywords belong; and select, in response to the song list satisfying the preset condition being included in the pre-generated song list set, the song list satisfying the preset condition as the to-be-played song list, to generate the to-be-played song list set.

In some embodiments, the first category keyword is preset to have a weight value. The to-be-played song list set generating unit is further configured to: determine, in response to the song list satisfying the preset condition being not included in the pre-generated song list set, weight values of the at least two first keywords respectively; and select, based on a first keyword having a maximum weight value and a subcategory to which the first keyword having the maximum weight value belongs, a song list from the pre-generated song list set as the to-be-played song list, to generate the to-be-played song list set.

In some embodiments, the apparatus further includes: a second keyword determining unit, configured to determine, in response to determining a preset second category keyword being included in the first user sentence, the second category keyword included in the first user sentence as a second keyword; and a target keyword determining unit, configured to determine, based on the second keyword and the first keyword set, a target keyword from the preset first category keyword, and determine a subcategory to which the target keyword belongs. The to-be-played song list set generating unit is further configured to: select, based on the target keyword and the subcategory to which the target keyword belongs, a song list from the pre-generated song list set as the to-be-played song list, to generate the to-be-played song list set.

In some embodiments, the apparatus further includes: a playing unit, configured to play the audio included in the song list in the to-be-played song list set.

In some embodiments, the apparatus further includes: a performing unit, configured to perform, in response to determining a preset third category keyword beining included in a received second user sentence, a corresponding preset operation based on the third category keyword included in the second user sentence, the preset operation including one of: switching a currently played song list and adding the currently played song list to favourites.

In a third aspect, the embodiments of the present disclosure provide a terminal device. The terminal device includes: one or more processors; and a storage device, configured to store one or more programs. The one or more programs, when executed by the one or more processors, cause the one or more processors to implement the method described in any implementation in the first aspect.

In a fourth aspect, the embodiments of the present disclosure provide a computer readable medium storing a computer program. The program, when executed by a processor, implements the method described in any implementation in the first aspect.

According to the method and apparatus for generating information provided by the embodiments of the present disclosure, the first user sentence from the user is first analyzed. Then, the first keyword is determined from the first user sentence, and the subcategory to which the first keyword belongs is determined. Accordingly, the to-be-played song list is selected from the pre-generated song list set, based on the first keyword and the subcategory of the first keyword. According to the method, it is realized that related songs are pushed using the song list as a unit on the basis of parsing the user sentence.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be described below in detail with reference to the accompanying drawings and in combination with the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
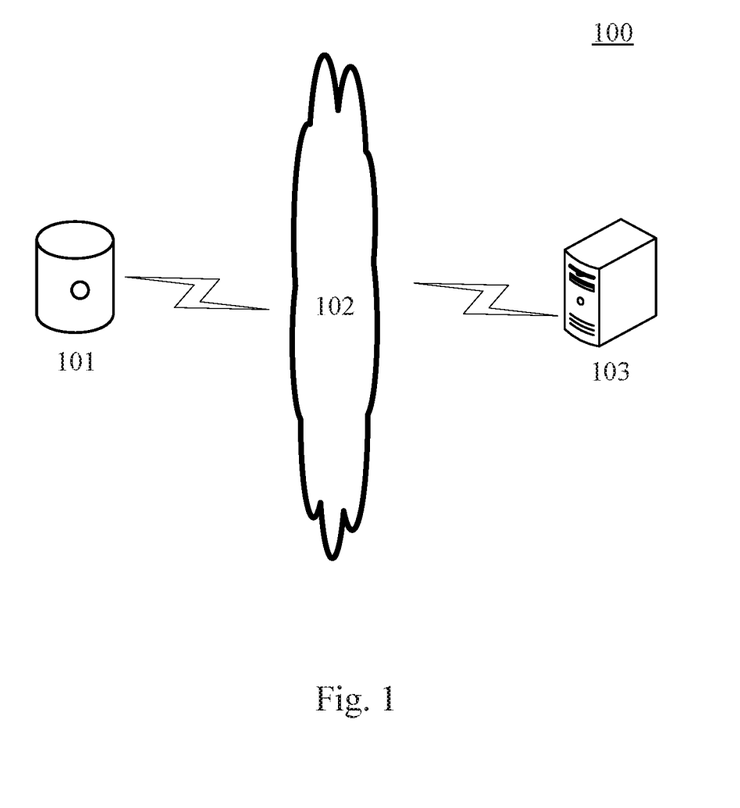
FIG. 1 is a diagram of an exemplary system architecture in which an embodiment of the present disclosure may be applied.

FIG. 1 shows an exemplary system architecture 100 in which a method for generating information or an apparatus for generating information according to the present disclosure may be applied.

As shown in FIG. 1, the system architecture 100 may include a smart, speaker 101, a network 102 and a server 103. The network 102 serves as a medium providing a communication link between the smart speaker 101 and the server 103. The network 102 may include various types of connections, for example, wired or wireless communication links, or optical fiber cables. The smart speaker 101 interacts with the server 103 via the network 102, to receive or send messages.

The server 103 may be a server providing various services, for example, a database server providing a song list for the smart speaker 101. Specifically, the smart speaker 101 is connected to the database server via the network 102, and then acquire the song list from the database server. In some embodiments, the database server pre-stores a certain number of song lists, and may update the pre-stored song lists within a preset time period (e.g., 24 hours).

It should be noted that the server 103 may be hardware or software. When being the hardware, the server may be implemented as a distributed server cluster composed of a plurality of servers, or as a single server. When being the software, the server may be implemented as a plurality of pieces of software or a plurality of software modules (e.g., software or software modules for providing a distributed service), or as a single piece of software or a single software module, which will not be specifically defined here.

The smart speaker 101 may be hardware or software. When being the hardware, the smart speaker 101 may be various electronic devices having a voice interaction function. When being the software, the smart speaker 101 may be installed in the above listed electronic devices having the voice interaction function. The smart speaker 101 may be implemented as a plurality of pieces of software or a plurality of software modules (e.g., software or software modules for providing a distributed service), or as a single piece of software or a single software module, which will not be specifically defined here.

It should be noted that the song lists may also be directly and locally stored in the smart speaker 101, and the smart speaker 101 may directly extract the locally stored song lists, and process the song lists. In this case, the server 103 may not be provided.

It should be noted that the method for generating information provided by the embodiments of the present disclosure is generally performed by the smart speaker 101. Correspondingly, the apparatus for generating information is generally arranged in the smart speaker 101.

It should be appreciated that the numbers of the smart speakers, the networks, and the servers in FIG. 1 are merely illustrative. Any number of smart speakers, networks, and servers may be provided based on actual requirements.

Figure 2:
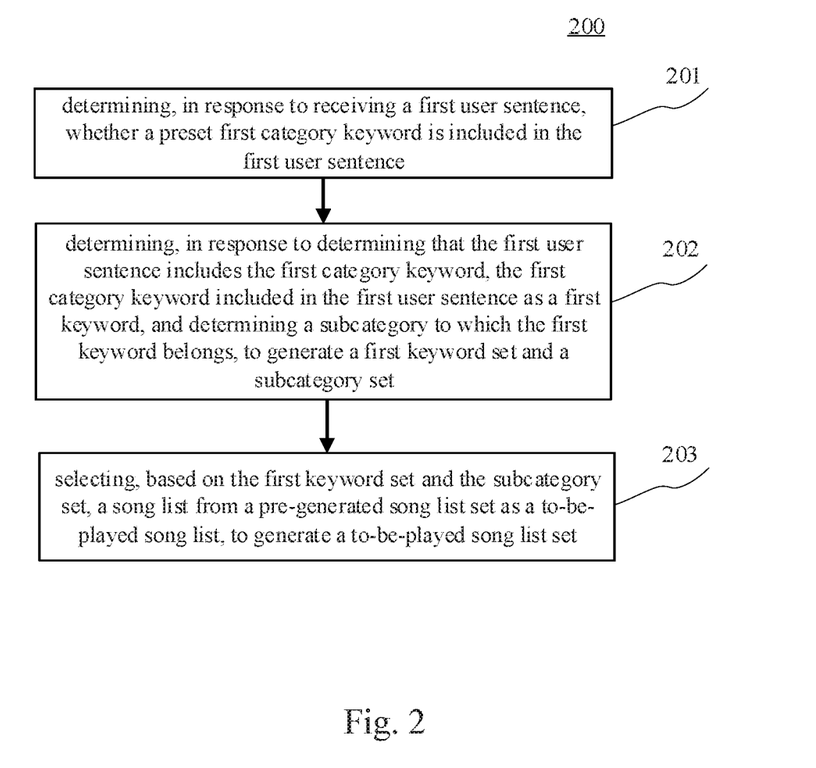
FIG. 2 is a flowchart of an embodiment of a method for generating information according to the present disclosure.

Further referring to FIG. 2, a flow 200 of an embodiment of a method for generating information according to the present disclosure is illustrated. The method for generating information includes the following steps:

Step 201 includes determining, in response to receiving a first user sentence, whether a preset first category keyword is included in the first user sentence.

In this embodiment, when receiving the first user sentence from a user, a performing subject (e.g., the smart speaker 101 shown in FIG. 1) of the method for generating information may further determine whether the first category keyword is included in the first user sentence. The first user sentence is usually a voice received from the user by the performing subject before playing an audio. As an example, the first user sentence may be a voice directly produced by the user. As an example, the first user sentence may alternatively be a pre-recorded voice produced by the user.

In this embodiment, the first category keyword is generally preset. In some embodiments, the first category keyword is generally used to represent the category of a song list, and the first category includes at least one subcategory. The song list includes at least one piece of audio and song list category information. Here, the audio included in the song list is usually the audio of a song that is pre-recorded. The song list category information is preset, and generally corresponds to the first category keyword and the subcategory included in the first category. As an example, the first category includes the subcategory "music genre," the first category keyword includes the keyword "rock," and the keyword "rock" belongs to the subcategory "music genre." In this case, the song list category information corresponding to the keyword "rock" and the subcategory "music genre" may include information indicating that the "music genre" of the song list is "rock."

In this embodiment, the performing subject may parse the first user sentence to determine whether the first category keyword is included in the first user sentence. In some embodiments, the performing subject may perform an analysis such as a grammatical analysis and a semantic analysis on the first user sentence using a natural language processing (NIP) technology, to determine whether the first category keyword is included in the first user sentence. It should be noted that using the natural language processing technology to parse the user sentence is a well-known technique widely studied and applied at present, which will not be repeatedly described here.

Step 202 includes determining, in response to determining that the first user sentence includes the first category keyword, the first category keyword included in the first user sentence as a first keyword, and determining a subcategory to which the first keyword belongs, to generate a first keyword set and a subcategory set.

In this embodiment, in response to determining that the first user sentence include the first category keyword, the performing subject may determine the first category keyword included in the first user sentence as the first keyword, and then determine the subcategory to which the first keyword belongs, to generate the first keyword set and the subcategory set.

As an example, the first category includes the subcategory "music genre" and the subcategory "language," and the preset first category keywords include the keyword "rock" and the keyword "Chinese." Here, the keyword "rock" belongs to the subcategory "music genre," and the keyword "Chinese" belongs to the subcategory "language." In this case, if the first user sentence is "I want to listen to rock," the performing subject may parse "I want to listen to rock" using the natural language processing technology, and then perform matching in the preset first category keywords. In this way, it is determined that the first user sentence "I want to listen to rock" includes the keyword "rock," thus generating the first keyword set. It is further determined that the subcategory to which the keyword "rock" belongs is "music genre," thus generating the subcategory set.

Similarly, if the first user sentence is "I want to listen to Chinese rock," the performing subject may determine that the first user sentence "I want to listen to rock" includes the keyword "Chinese" and the keyword "rock," to generate the first keyword set. Then, it is determined that the subcategory to which the keyword "Chinese" belongs and the subcategory to which the keyword "rock" belongs are respectively "language" and "music genre," thus generating the subcategory set.

Step 203 includes selecting, based on the first keyword set and the subcategory set, a song list from a pre-generated song list set as a to-be-played song list, to generate a to-be-played song list set.

In this embodiment, the song list set includes at least one song list. In some embodiments, the song list set may be stored in a database server communicated with the performing subject, or stored locally in the performing subject. Alternatively, a technician may generate the song list set through the following steps. In the first step, a certain number of song lists are selected from an arbitrary server, and the names of the song lists are parsed using the natural language processing technology. In the second step, first category keywords included in the names of the song lists and the subcategories to which the first category keywords belong are determined. In the third step, the song list category information is generated through the first category keywords included in the keywords and the subcategories to which the first category keywords belong. As an example, if the first category keywords include "quiet," the subcategory to which the keyword "quiet" belongs is "style," and the name of the song list is "songs for listening at quiet time." The technician may perform the analysis such as the grammatical analysis and the semantic analysis on the name "songs for listening at quiet time" of the song list using the natural language processing (NLP) technology, and then perform the matching in the first category keywords, to determine that the keyword included in the name of the song list "songs for listening at quiet time" and the subcategory to which the keyword belongs are respectively "quiet" and "style." Therefore, the song list category information may be shown by the information indicating that the "style" is "quiet."

In this embodiment, after generating the first keyword set and the subcategory set, the performing subject may select a corresponding song list from the pre-generated song list set, to generate the to-be-played song list set.

Reference is further made to the example in step 202. After generating the first keyword set and the subcategory set, the performing subject may perform matching in the pre-generated song list set. If the first user sentence is "I want to listen to rock," the performing subject may select a song list whose song list category information includes the information indicating that the "music genre" of the song list is "rock," to generate the to-be-played song list set. If the first user sentence is "I want to listen to Chinese rock," the performing subject may select a song list whose song list category information includes the information indicating that the "music genre" of the song list is "rock" and the information indicating that the "language" of the song list is "Chinese," to generate the to-be-played song list set.

In some alternative implementations of this embodiment, in response to successively receiving the first user sentences, the performing subject may select, from the to-be-played song list set generated last time, a song list satisfying a condition, to generate a new to-be-played song list set. Further referring to the previous example, the song list having the song list category information including the information indicating that the "music genre" of the song list is "rock" is selected as the to-be-played song list, to generate the to-be-played song list set. Afterwards, if the first user sentence "I want to listen to Chinese songs" is received, according to steps 201 and 202, the performing subject may determine that "I want to listen to Chinese songs" includes the keyword "Chinese," and determine that the subcategory to which the keyword "Chinese" belongs is "language." Further, the performing subject may select, from the to-be-played song list, the song list whose song list category information includes the information indicating that the "language" of the song list is "Chinese," to generate the new to-be-played song list set.

In some alternative implementations of this embodiment, the method includes: determining, in response to determining a preset second category keyword is included in the first user sentence, the second category keyword included in the first user sentence as a second keyword; and determining, based on the second keyword and the first keyword set, a target keyword from the preset first category keyword, and determining a subcategory to which the target keyword belongs it may be seen that the target keyword belongs to the first category keywords. The second category keyword is generally preset. Second category keywords are generally some verb phrases representing negative meanings such as "not want to listen to" or "not to listen to."

In these implementations, the performing subject may perform the analysis such as the grammatical analysis and the semantic analysis on the first user sentence using the natural language processing technology, to determine the second category keyword in the first user sentence. Then, a keyword having an opposite meaning to the first keyword is determined from the first category keywords to be used as the target keyword, and the subcategory to which the target keyword belongs is determined. In some embodiments, the corresponding relationship between the first keyword and the target keyword may be determined by pre-training a large amount of data, and then the target keyword is obtained through the first keyword, which will not be repeatedly described here.

As an example, the first category includes the subcategory "music genre" and the subcategory "style," and the preset first category keywords include keywords "rock," "folk," "soothing," and "uplifting." Here, the keywords "rock" and "folk" belong to the subcategory "music genre," and the keywords "soothing" and "uplifting" belong to the subcategory "style." in this case, if the first user sentence is "I do not want to listen to rock," the performing subject may parse "I do not want to listen to rock" using the natural language processing technology. Then, the matching is performed in the preset second category keyword and the first category keywords, to respectively determine that "I do not want to listen to rock" includes the second category keywords "not want to listen to" and the first category keyword "rock." Further, the performing subject determines, from the first category keywords, the keywords "folk" and "soothing" having of the opposite meaning to the keyword "rock" to be used as target keywords, and determines that the subcategories to which the target keywords belong are respectively "music genre" and "style."

In these implementations, the selecting, based on the first keyword set and the subcategory set, a song list from a pre-generated song list set as a to-be-played song list, to generate a to-be-played song list set includes: selecting, based on the target keyword and the subcategory to which the target keyword, the song list from the pre-generated song list set as the to-be-played song list to generate the to-be-played song list set.

Further referring to the previous example, the performing subject may select, from the pre-generated song list set, the song list having the song list category information including information indicating that the "music genre" of the song list is "folk," and/or the song list having the song list category information including information indicating that the "style" of the song list is "soothing," to generate the to-be-played song list set.

In some alternative implementations of this embodiment, the performing subject may play the audio included an the song list an the to-be-played song list set.

In some alternative implementations of this embodiment, the method includes: performing, in response to determining a preset third category keyword being included in a received second user sentence, a corresponding preset operation based on the third category keyword included in the second user sentence. Here, the second user sentence is usually a voice received from the user by the performing subject during the playing of the audio. The second user sentence may be a voice directly produced by the user, or a pre-recorded voice produced by the user. The third category keyword may be preset, and generally corresponds to the operation performed on the currently played song list by the user, for example, "switching the song list," and "adding the song list to the favourites." The preset operation is generally preset, and used to represent an operation that may be performed on the currently played song list by the user. The preset operation includes one of: switching the currently played song list, and adding the currently played song list to the favourites.

As an example, if the third category keywords include the keywords "switching the song list" and "adding the song list to the favorites," and when the second user sentence is "Dear, switches the song list," the performing subject may parse the second user sentence using the natural language processing technology. Then, matching is performed in the third category keywords, to determine the keywords "switching the song list." Further, the performing subject may switch the currently played song list and play an audio included in other song lists in the to-be-played song list set. It may be understood that when the second user sentence is "Dear, adds the song list to the favorites," the performing subject may process the second user sentence according to the above steps, and then add the currently played song list to the favorites.

In some alternative implementations of this embodiment, the preset operation may further include: switching the currently played song, and adding the currently played song to the favorites. When the number of times the user switches the song or adds the song to the favorites reaches a preset threshold (e.g., 5 or 6), the performing subject may correspondingly switch the currently played song list or add the current played song list to the favorites.

In some alternative implementations of this embodiment, the song list may include the name of the song list. The performing subject may broadcast the names of these song lists before playing an audio included in the song lists.

Figure 3:
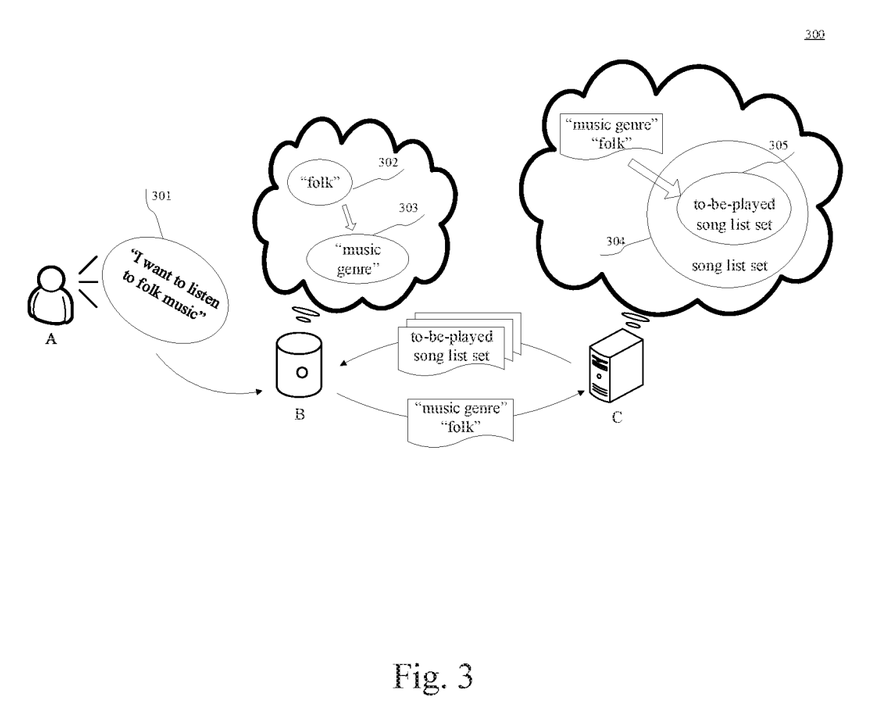
FIG. 3 is a schematic diagram of an application scenario of the method for generating information according to the present disclosure.

Further referring to FIG. 3, FIG. 3 is a schematic diagram of an application scenario of the method for generating information according to the embodiment. In the application scenario of FIG. 3, after receiving the voice "I want to listen to folk" 301 from the user A, the smart speaker B may determine the first category keyword "folk" 302 included in the voice "I want to listen to folk" 301, and further determine the subcategory "music genre" 303 to which the keyword "folk" 302 belongs. Then, the smart speaker B may perform matching in the database server C storing the song list set 304, and then select, from the song list set 304, the song list having the song list category information including the information indicating that the "music genre" of the song list is "folk" as the to-be-played song list, to generate the to-be-played song list set 305.

According to the method provided by the above embodiment of the present disclosure, the first category keyword included in the first user sentence and the subcategory to which the first category keyword belongs are first determined. Then, the song list having the song list category information including the information indicating the corresponding relationship between the first keyword and the subcategory to which the first keyword belongs is selected from the pre-generated song list set, to generate the to-be-played song list set. Thus, it is realized that the to-be-played song list set is generated by parsing the voice of the user.

Figure 4:
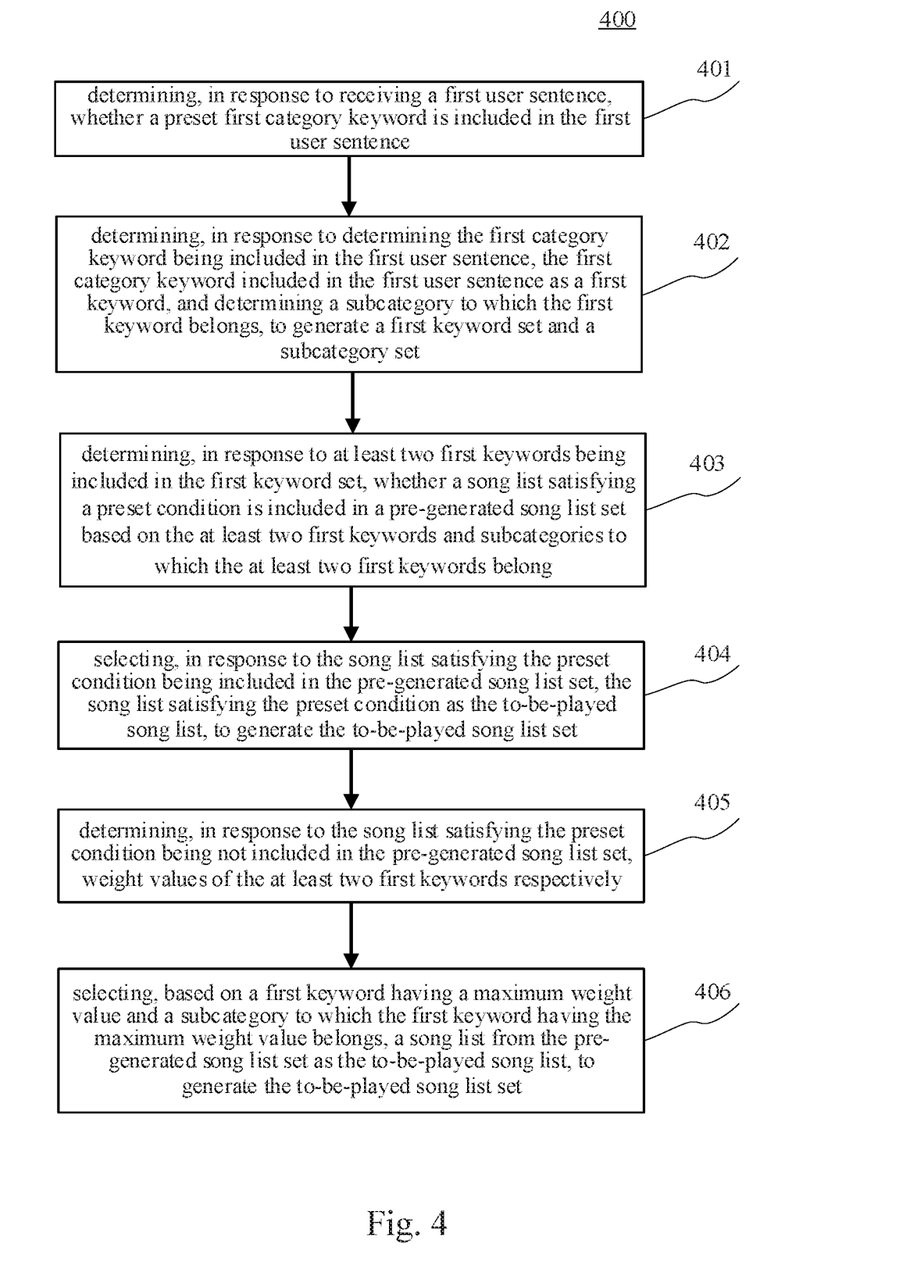
FIG. 4 is a flowchart of another embodiment of the method for generating information according to the present disclosure.

Further referring to FIG. 4, FIG. 4 illustrates a flow 400 of another embodiment of the method for generating information. The flow 400 of the method for generating information includes the following steps 401 to 406.

Step 401 includes determining, in response to receiving a first user sentence, whether a preset first category keyword is included in the first user sentence.

Step 402 includes determining, in response to determining the first category keyword being included in the first user sentence, the first category keyword included an the first user sentence as a first keyword, and determining a subcategory to which the first keyword belongs, to generate a first keyword set and a subcategory set.

For specific processes of steps 401 and 402 and their technical effects, reference may be made to steps 201 and 202 in the corresponding embodiment of FIG. 2, which will not be repeatedly described here.

Step 403 includes determining, in response to at an least two first keywords being included in the first keyword set, whether a song list satisfying a preset condition is included in a pre-generated song list set based on the at least two first keywords and subcategories to which the at least two first keywords belong.

In this embodiment, the preset condition is generally preset by a technician, and generally refers to that the song list category information includes information corresponding to the first keywords in the first keyword set and the subcategories to which the first keywords belong. As an example, if the first keyword set includes the keyword "Chinese" and the keyword "rock," and the subcategory to which the keyword "Chinese" belongs and the subcategory to which the keyword "rock" belongs are respectively "language" and "music genre," the song list satisfying the preset condition may be a song list having the song list category information including both the information indicating that the "music genre" of the song list is "rock," and the information indicating that the "language" of the song list is "Chinese."

In this embodiment, in response to the at least two first keywords being included in the first keyword set, a performing subject (the smart speaker 101 as shown in FIG. 1) of the method for generating information may perform matching in the pre-generated song list set, to determine whether the song list satisfying the preset condition is included in the pre-generated song list set.

As an example, if the first keyword set includes the first keyword "Chinese" and the first keyword "rock," and the subcategory to which the first keyword "Chinese" belongs and the subcategory to which the first keyword "rock" belongs are respectively "language" and "music genre," the performing subject may perform the matching in the pre-generated song list set, to determine whether the song list having the song list category information is included in the pre-generated song list set, the song list category information including the information indicating that the "music genre" of the song list is "rock" and the information indicating that the "language" of the song list is "Chinese."

Step 404 includes selecting, in response to the song list satisfying the preset condition being included in the pre-generated song list set, the song list satisfying the preset condition as the to-be-played song list, to generate the to-be-played song list set.

In this embodiment, in response to the song list satisfying the preset condition being included in the pre-generated song list set, the performing subject may select the song list satisfying the preset condition as the to-be-played song list, to generate the to-be-played song list set.

Step 405 includes determining, in response to the song list satisfying the preset condition being not included in the pre-generated song list set, weight values of the at least two first keywords respectively.

In this embodiment, the first category keyword may be pre-set to have a weight value. The weight value of the first category keyword may be preset by the technician. For example, the weight of a keyword may be represented by a numerical value between 0 and 1, and the closer to 1 the numerical value is, the greater the weight value represented by the numerical value is. In some embodiments, the first category keyword and the weight value of the first category keyword are associated and stored.

As an example, if the weight value of the keyword "rock" is preset to 0.6, and the weight value of the keyword "Chinese" is preset to 0.1. If the song list having the song list category information including the information indicating that the "music genre" of the song list is "rock" and the information indicating that the "language" of the song list is "Chinese" is not included in the pre-generated song list set. The performing subject may further determine that the weight values of the keywords "rock" and "Chinese" are respectively 0.6 and 0.1.

Step 406 includes selecting, based on a first keyword having a maximum weight value and a subcategory to which the first keyword having the maximum weight value belongs, a song list from the pre-generated song list set as the to-be-played song list, to generate the to-be-played song list set.

In this embodiment, the performing subject may determine the keyword having the maximum weight value, and then select a corresponding song list from the pre-generated song list set as the to-be-played song list, to generate the to-be-played song list set.

Referring to the example in step 405, the performing subject may use the keyword "rock" as the keyword having the maximum weight value, and then select, from the pre-generated song list set, the song list having the song list category information including the information indicating that the "music genre" of the song list is "rock," to generate the to-be-played song list set.

It may be seen from FIG. 4 that, as compared with the embodiment corresponding to FIG. 2, the flow 400 of the method for generating information in this embodiment emphasizes the step of generating the to-be-played song list set through the at least two first keywords and the subcategories to which the at least two first keywords belong. Thus, it is realized that the to-be-played song list set is generated by presetting the weight value of the first keyword.

Figure 5:
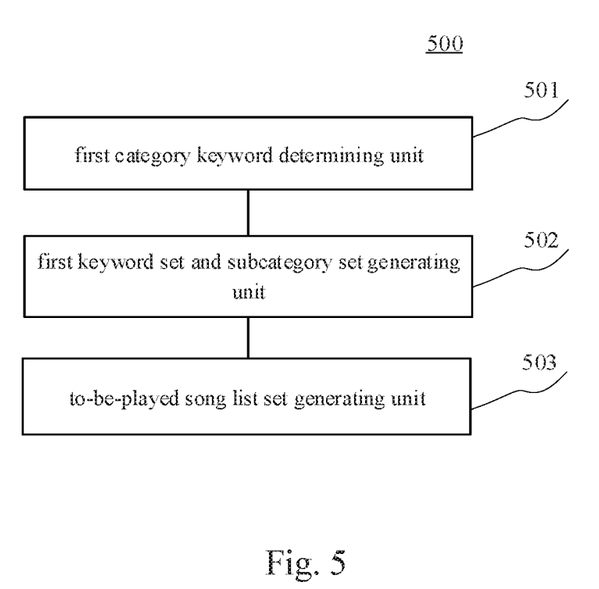
FIG. 5 is a schematic structural diagram of an embodiment of an apparatus for generating information according to the present disclosure.

Further referring to FIG. 5, as an implementation of the method shown in the above drawings, the present disclosure provides an embodiment of an apparatus for generating information. The embodiment of the apparatus corresponds to the embodiment of the method shown in FIG. 2, and the apparatus may be applied in various electronic devices.

As shown in FIG. 5, the apparatus 500 for generating information provided in this embodiment includes: a first category keyword determining unit 501, a first keyword set and subcategory set generating unit 502 and a to-be-played song list set generating unit 503. The first category keyword determining unit 501 is configured to determine, in response to receiving a first user sentence, whether a preset first category keyword is included in the first user sentence, a first category including at least one subcategory. The first keyword set and subcategory set generating unit 502 is configured to determine, in response to determining the first category keyword being included in the first user sentence, the first category keyword included in the first user sentence as a first keyword, and determine a subcategory to which the first keyword belongs, to generate a first keyword set and a subcategory set. The to-be-played song list set generating unit 503 is configured to select, based on the first keyword set and the subcategory set, a song list from a pre-generated song list set as a to-be-played song list, to generate a to-be-played song list set, the song list including at least one piece of audio and song list category information.

In this embodiment, for specific processes of the first category keyword determining unit 501, the first keyword set and subcategory set generating unit 502 and the to-be-played song list set generating unit 503 in the apparatus 500 for generating information, and their technical effects, reference may be made to relative descriptions of step 201, step 202 and step 203 in the corresponding embodiment of FIG. 2 respectively, which will not be repeatedly described here.

In some alternative implementations of this embodiment, the to-be-played song list set generating unit 503 may be further configured to: determine, in response to at least two first keywords being included in the first keyword set, whether a song list satisfying a preset condition is included in the pre-generated song list set, based on the at least two first keywords and subcategories to which the at least two first keywords belong; and select, in response to the song list satisfying the preset condition being included in the pre-generated song list set, the song list satisfying the preset condition as the to-be-played song list, to generate the to-be-played song list set.

In some alternative implementations of this embodiment, the first category keyword may be preset to have a weight value. The to-be-played song list set generating unit 503 may be further configured to: determine, in response to the song list satisfying the preset condition being not included in the pre-generated song list set, weight values of the at least two first keywords respectively; and select, based on a first keyword having a maximum weight value and a subcategory to which the first keyword having the maximum weight value belongs, a song list from the pre-generated song list set as the to-be-played song list, to generate the to-be-played song list set.

In some alternative implementations of this embodiment, the apparatus 500 for generating information further includes: a second keyword determining unit (not shown), configured to determine, in response to determining a preset second category keyword being included in the first user sentence, the second category keyword included in the first user sentence as a second keyword; and a target keyword determining unit (not shown), configured to determine, based on the second keyword and the first keyword set, a target keyword from the preset first category keyword, and determine a subcategory to which the target keyword belongs. In this case, the to-be-played song list set generating unit 503 may be further configured to: select, based on the target keyword and the subcategory to which the target keyword belongs, a song list from the pre-generated song list set as the to-be-played song list, to generate the to-be-played song list set.

In some alternative implementations of this embodiment, the apparatus 500 for generating information further includes: a playing unit (not shown), configured to play the audio included in the song list in the to-be-played song list set.

In some alternative implementations of this embodiment, the apparatus 500 for generating information further includes: a performing unit (not shown), configured to perform, in response to determining a preset third category keyword being included in a received second user sentence, a corresponding preset operation based on the third category keyword included in the second user sentence, the preset operation including one of: switching a currently played song list and adding the currently played song list to favourites.

According to the apparatus 500 provided by the above embodiment of the present disclosure, the first category keyword determining unit 501 first determines whether the preset first category keyword is included in the first user sentence. Then, in the case where the first category keyword being included in the first user sentence is determined, the first keyword set and subcategory set generating unit 502 determines the first category keyword included in the first user sentence as the first keyword and determines the subcategory to which the first keyword belongs, to generate the first keyword set and the subcategory set. Furthermore, the to-be-played song list set generating unit 503 selects the song list from the pre-generated song list set as the to-be-played song list based on the first keyword set and the subcategory set, to generate the to-be-played song list set. The apparatus implements that the songs are pushed using the song list as a unit, thereby improving the accuracy of the pushing the songs.

Figure 6:
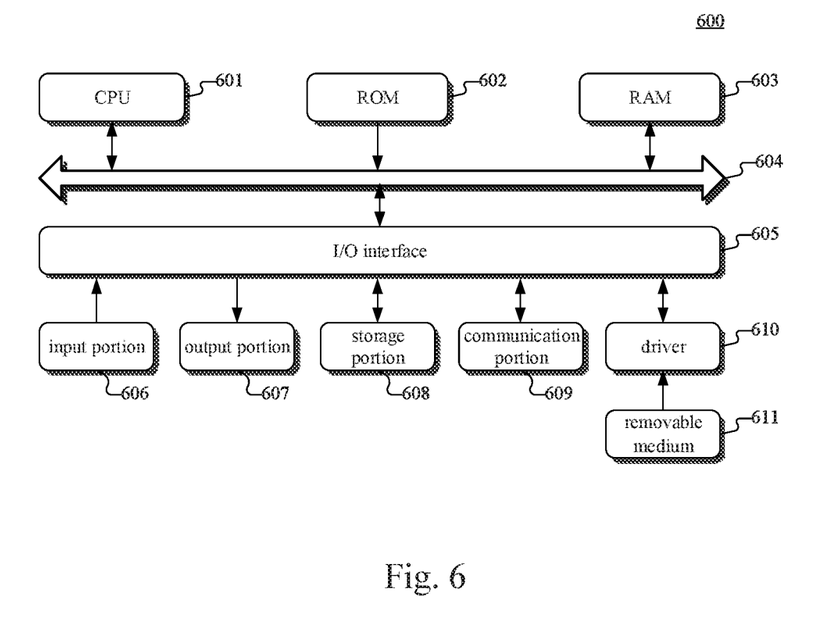
FIG. 6 is a schematic structural diagram of a computer system adapted to implement a terminal device according to the embodiments of the present disclosure.

Referring to FIG. 6, FIG. 6 is a schematic structural diagram of a computer system 600 adapted to implement a terminal device (e.g., the smart speaker in FIG. 1) of the embodiments of the present disclosure. The terminal device shown in FIG. 6 is merely an example, and should not bring any limitations to the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a microphone, etc.; an output portion 607 including a liquid crystal display device (LCD), a speaker etc.; a storage portion 608 including a hard disk and the like; and a communication portion 609 including a network interface card such as a LAN card and a modem. The communication portion 609 performs communication processes via a network such as the Internet. A driver 610 is also connected to the I/O interface 605 as required. A removable medium 611 such as a magnetic disk, an optical disk, a magneto-optical disk, and a semiconductor memory may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 609, and/or may be installed from the removable medium 611. The computer program, when executed by the central processing unit (CPU) 601, implements the above mentioned functionalities defined in the method of the present disclosure.

It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs, which may be used by a command execution system, apparatus or element or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, a command execution system, apparatus or element. The program codes contained on the computer readable medium may be transmitted with any suitable medium including, but not limited to, wireless, wired, optical cable, RF medium, or any suitable combination of the above.

A computer program code for executing the operations according to the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor, for example, described as: a processor, comprising a first category keyword determining unit, a first keyword set and subcategory set generating unit and a to-be-played song list set generating unit. Here, the names of these units do not in some cases constitute a limitation to such units themselves. For example, the first category keyword determining unit may also be described as "a unit for determining, in response to receiving a first user sentence, whether a preset first category keyword is included in the first user sentence."

In another aspect, the present disclosure further provides a computer readable medium. The computer readable medium may be the computer readable medium included in the apparatus described in the above embodiments, or a stand-alone computer readable medium not assembled into the apparatus. The computer readable medium stores one or more programs. The one or more programs, when executed by the apparatus, cause the apparatus to: determine, in response to receiving a first user sentence, whether a preset first category keyword is included in the first user sentence, a first category including at least one subcategory; determine, in response to determining the first category keyword being included in the first user sentence, the first category keyword included in the first user sentence as a first keyword, and determine a subcategory to which the first keyword belongs, to generate a first keyword set and a subcategory set; and select, based on the first keyword set and the subcategory set, a song list from a pre-generated song list set as a to-be-played song list, to generate a to-be-played song list set, the song list including at least one piece of audio and song list category information.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A method for generating information, comprising:
   determining, in response to receiving a first user sentence, whether a first category keyword of a preset first category is included in the first user sentence, the first category including at least one subcategory;
   determining, in response to determining the first category keyword being included in the first user sentence, the first category keyword included in the first user sentence as a first keyword, and determining a subcategory to which the first keyword belongs, to generate a first keyword set and a subcategory set; and
   selecting, based on the first keyword set and the subcategory set, a song list from a pre-generated song list set as a to-be-played song list, to generate a to-be-played song list set, the song list including at least one piece of audio and song list category information, wherein the first category keyword is preset to have a weight value, and the selecting, based on the first keyword set and the subcategory set, a song list from a pre-generated song list set as a to-be-played song list, to generate a to-be-played song list set comprises:
   determining, in response to at least two first keywords being included in the first keyword set, whether a song list satisfying a preset condition is included in the pre-generated song list set, based on the at least two first keywords and subcategories to which the at least two first keywords belong;
   selecting, in response to the song list satisfying the preset condition being included in the pre-generated song list set, the song list satisfying the preset condition as the to-be-played song list, to generate the to-be-played song list set;
   determining, in response to the song list satisfying the preset condition being not included in the pre-generated song list set, weight values of the at least two first keywords respectively; and
   selecting, based on the first keyword having the maximum weight value and a subcategory to which the first keyword having the maximum weight value belongs, a song list from the pre-generated song list set as the to-be-played song list, to generate the to-be-played song list set.

2. The method according to claim 1, further comprising:
   determining, in response to determining a preset second category keyword being included in the first user sentence, the second category keyword included in the first user sentence as a second keyword; and
   determining, based on the second keyword and the first keyword set, a target keyword from the first category keyword, and determining a subcategory to which the target keyword belongs,
   wherein the selecting, based on the first keyword set and the subcategory set, a song list from a pre-generated song list set as a to-be-played song list, to generate a to-be-played song list set comprises:
   selecting, based on the target keyword and the subcategory to which the target keyword belongs, a song list from the pre-generated song list set as the to-be-played song list, to generate the to-be-played song list set.

3. The method according to claim 1, further comprising:
   playing the audio included in the song list in the to-be-played song list set.

4. The method according to claim 3, further comprising:
   performing, in response to determining a preset third category keyword being included in a received second user sentence, a corresponding preset operation based on the third category keyword included in the second user sentence, the preset operation including one of: switching a currently played song list and adding the currently played song list to favourites.

5. An apparatus for generating information, comprising:
   at least one processor; and
   a memory storing instructions, wherein the instructions when executed by the at least one processor, cause the at least one processor to perform operations, the operations comprising:
   determining, in response to receiving a first user sentence, whether a first category keyword of a preset first category is included in the first user sentence, the first category including at least one subcategory;
   determining, in response to determining the first category keyword being included in the first user sentence, the first category keyword included in the first user sentence as a first keyword, and determine a subcategory to which the first keyword belongs, to generate a first keyword set and a subcategory set; and
   selecting, based on the first keyword set and the subcategory set, a song list from a pre-generated song list set as a to-be-played song list, to generate a to-be-played song list set, the song list including at least one piece of audio and song list category information, wherein the first category keyword is preset to have a weight value, and the selecting, based on the first keyword set and the subcategory set, a song list from a pre-generated song list set as a to-be-played song list, to generate a to-be-played song list set comprises:
   determining, in response to at least two first keywords being included in the first keyword set, whether a song list satisfying a preset condition is included in the pre-generated song list set, based on the at least two first keywords and subcategories to which the at least two first keywords belong;

selecting, in response to the song list satisfying the preset condition being included in the pre-generated song list set, the song list satisfying the preset condition as the to-be-played song list, to generate the to-be-played song list set;

determining, in response to the song list satisfying the preset condition being not included in the pre-generated song list set, weight values of the at least two first keywords respectively; and selecting, based on the first keyword having the maximum weight value and a subcategory to which the first keyword having the maximum weight value belongs, a song list from the pre-generated song list set as the to-be-played song list, to generate the to-be-played song list set.

6. The apparatus according to claim 5, wherein the operations further comprise:

determining, in response to determining a preset second category keyword being included in the first user sentence, the second category keyword included in the first user sentence as a second keyword; and determining, based on the second keyword and the first keyword set, a target keyword from the first category keyword, and determine a subcategory to which the target keyword belongs, wherein the selecting, based on the first keyword set and the subcategory set, a song list from a pre-generated song list set as a to-be-played song list, to generate a to-be-played song list set comprises:

selecting, based on the target keyword and the subcategory to which the target keyword belongs, a song list from the pre-generated song list set as the to-be-played song list, to generate the to-be-played song list set.

7. The apparatus according to claim 5, wherein the operations further comprise:

playing the audio included in the song list in the to-be-played song list set.

8. The apparatus according to claim 7, wherein the operations further comprise:

performing, in response to determining a preset third category keyword being included in a received second user sentence, a corresponding preset operation based on the third category keyword included in the second user sentence, the preset operation including one of:

switching a currently played song list and adding the currently played song list to favourites.

9. A non-transitory computer readable medium, storing a computer program, wherein the program, when executed by a processor, causes the processor to perform operations, the operations comprising:

determining, in response to receiving a first user sentence, whether a category keyword of a preset first category is included in the first user sentence, the first category including at least one subcategory;

determining, in response to determining the first category keyword being included in the first user sentence, the first category keyword included in the first user sentence as a first keyword, and determining a subcategory to which the first keyword belongs, to generate a first keyword set and a subcategory set; and selecting, based on the first keyword set and the subcategory set, a song list from a pre-generated song list set as a to-be-played song list, to generate a to-be-played song list set, the song list including at least one piece of audio and song list category information, wherein the first category keyword is preset to have a weight value, and the selecting, based on the first keyword set and the subcategory set, a song list from a pre-generated song list set as a to-be-played song list, to generate a to-be-played song list set comprises:

determining, in response to at least two first keywords being included in the first keyword set, whether a song list satisfying a preset condition is included in the pre-generated song list set, based on the at least two first keywords and subcategories to which the at least two first keywords belong;

selecting, in response to the song list satisfying the preset condition being included in the pre-generated song list set, the song list satisfying the preset condition as the to-be-played song list, to generate the to-be-played song list set;

determining, in response to the song list satisfying the preset condition being not included in the pre-generated song list set, weight values of the at least two first keywords respectively; and selecting, based on the first keyword having the maximum weight value and a subcategory to which the first keyword having the maximum weight value belongs, a song list from the pre-generated song list set as the to-be-played song list, to generate the to-be-played song list set.

* * * * *